Sept. 1, 1931.  E. WEISKER  1,821,129
PHOTOGRAPHIC COPYING APPARATUS
Filed Feb. 18, 1927   3 Sheets-Sheet 1
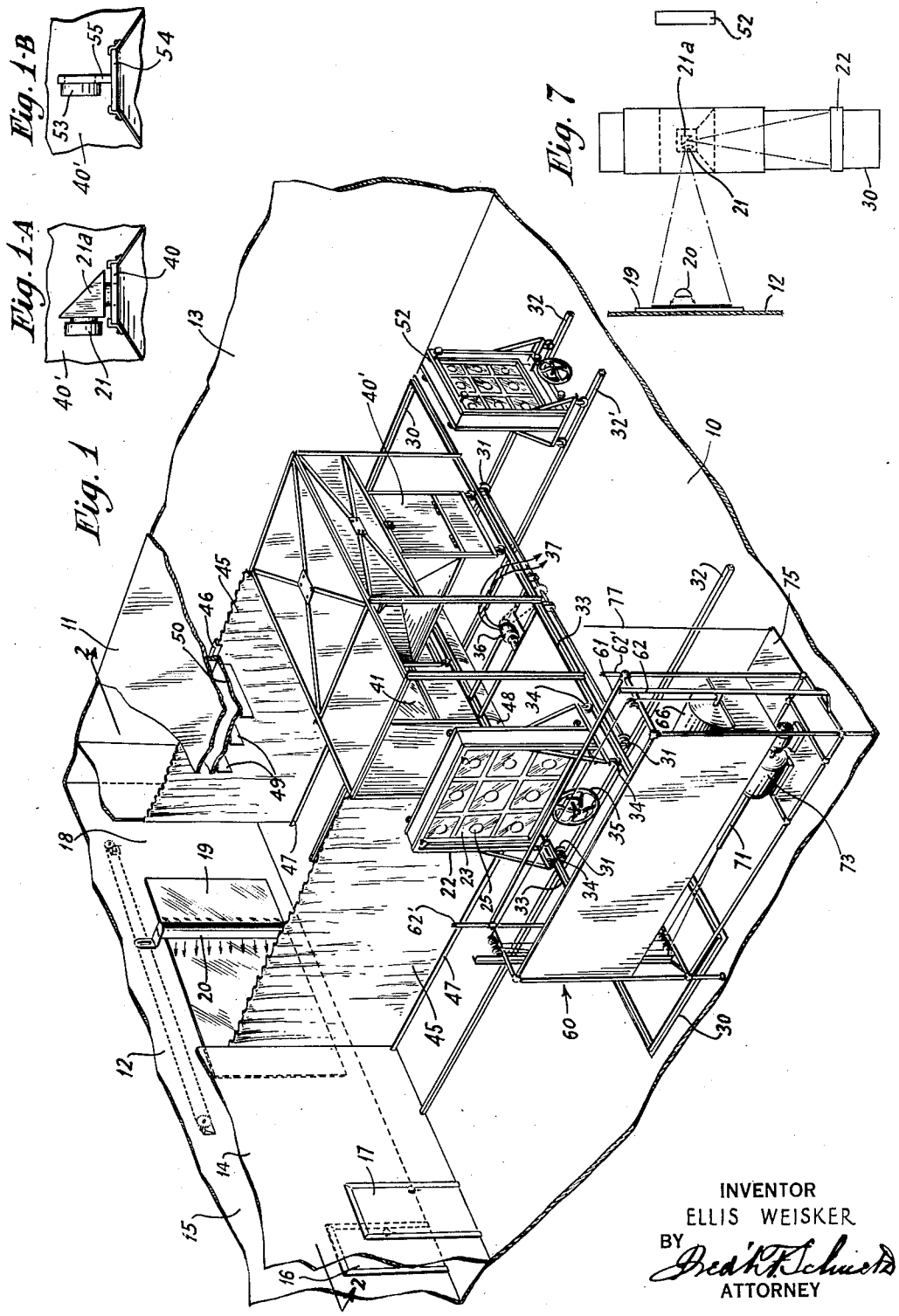
INVENTOR
ELLIS WEISKER
BY
ATTORNEY Sept. 1, 1931.   E. WEISKER   1,821,129
PHOTOGRAPHIC COPYING APPARATUS
Filed Feb. 18, 1927   3 Sheets-Sheet 2
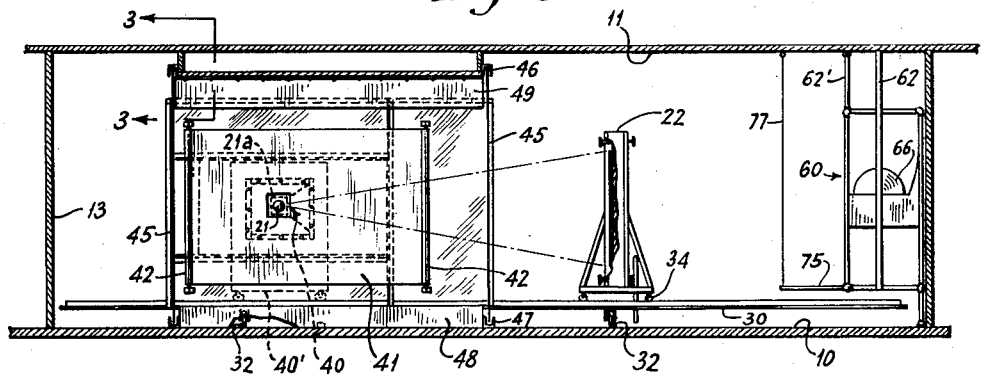
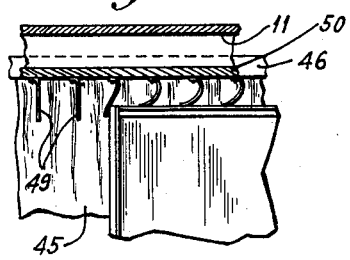
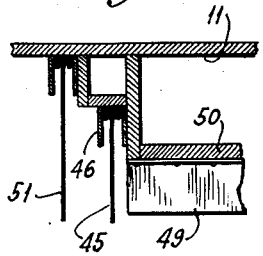
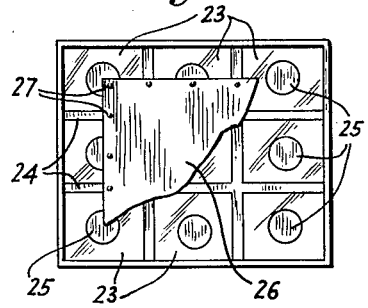
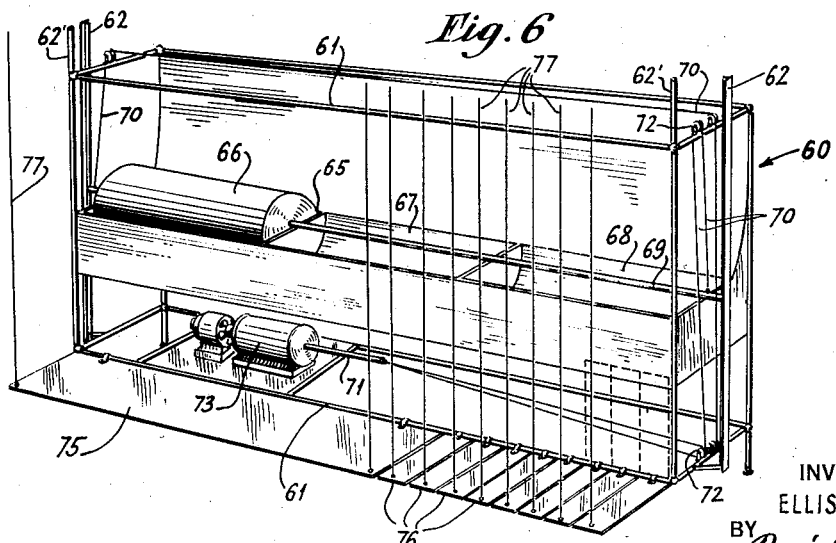
INVENTOR
ELLIS WEISKER
BY
ATTORNEY Sept. 1, 1931.  E. WEISKER  1,821,129
PHOTOGRAPHIC COPYING APPARATUS
Filed Feb. 18, 1927    3 Sheets-Sheet 3
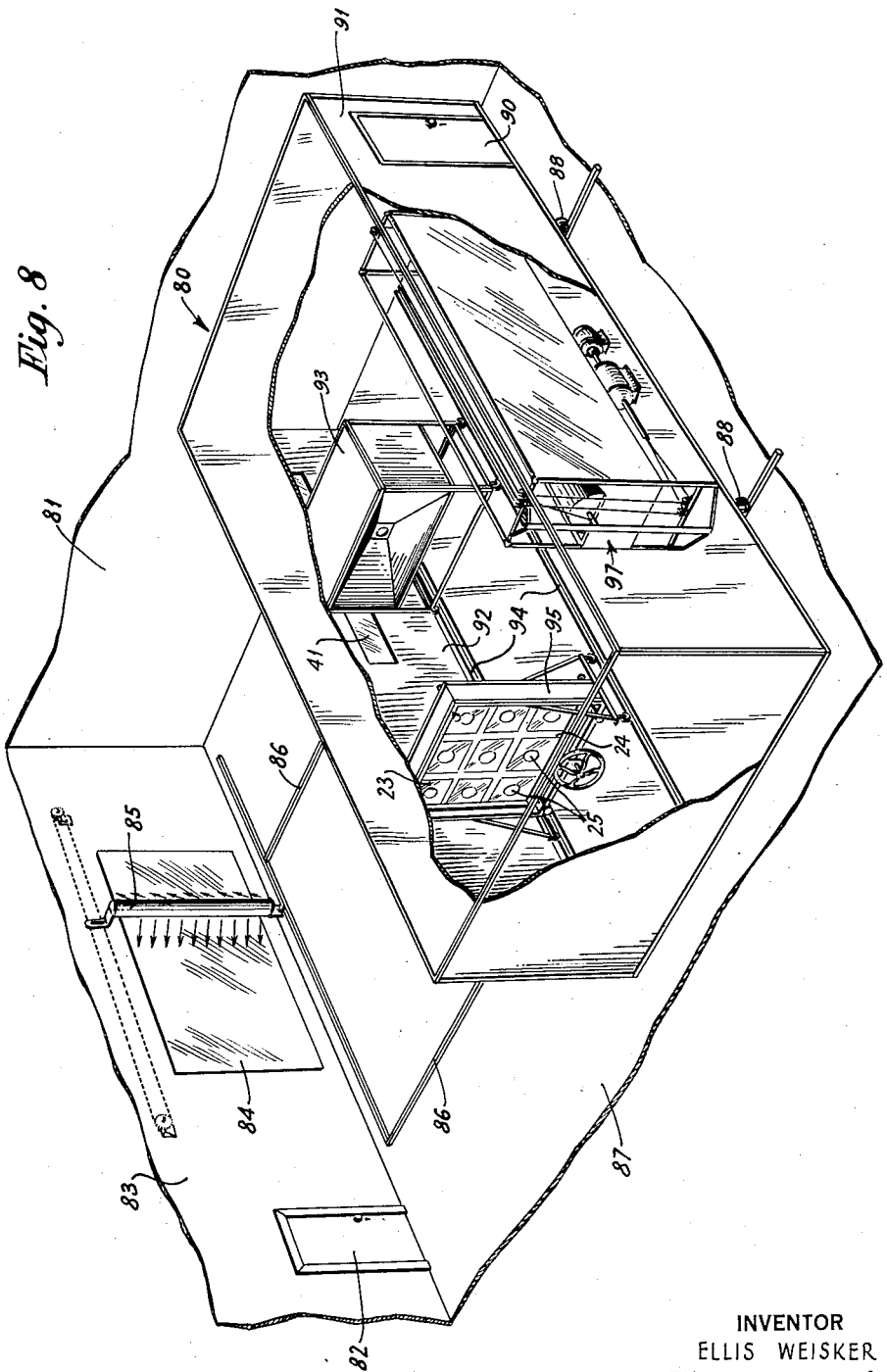
INVENTOR
ELLIS WEISKER
BY
ATTORNEY Patented Sept. 1, 1931

1,821,129

UNITED STATES PATENT OFFICE

ELLIS WEISKER, OF NEW YORK, N. Y.

PHOTOGRAPHIC COPYING APPARATUS

Application filed February 18, 1927. Serial No. 169,198.

The invention relates to the art of photography and is especially adapted to the production of photostat reproductions of copy, the resulting print obtained being either of the same dimension as the original or differing therefrom. More particularly, the invention is concerned with the production of photographs or prints of dimensions heretofore not attempted.

It has for its object to enable reproductions of any desired size to be readily and conveniently made; and to this end, the entire photographic operation, including both the exposure of the sensitized material and the developing of the same, are arranged to be conducted in one and the same room or closed compartment which may contain also means for suitably illuminating the copy. The said copy and illuminating means therefor is, in accordance with the invention, to be suitably screened and the light excluded from the surrounding portion of the room, while the camera employed is to be freely movable toward and away from said copy conformably with the dimensions of the print desired. By the novel expedient, the illumination may be present within a bellows portion located in front of the lens, while the usual bellows present in a camera and located normally between its lens and the ground glass or plate holder portion is then entirely dispensed with. In a modified arrangement, the room as a whole may be constructed to be bodily movable toward and away from the source of illumination.

The invention has for a further object to dispense with the usual type of removable and sealed holder for the sensitized material, as the customary holder of the required size would be of excessive weight and difficult to handle. A still further object of the invention is to permit of effecting the various operations in a room of not undue dimensions.

To this end, the invention consists in separately and independently mounting the lens retaining portion of the camera and the focusing or ground glass thereof and in the novel arrangement of the room with respect to the illuminating means for the copy, as well as of the photographic and developing apparatus to be located in the said room.

The nature of the invention, however, will best be understood when described in connection with the accompanying drawings, in which:—

Fig. 1 is a perspective view of the novel photographic apparatus and associated dark room, with portions of the walls and ceiling of said room broken away to disclose the interior.

Figs. 1A and 1B are fragmentary views of the lens board, the latter view illustrating the form of board provided with lens only and utilized for direct photography, while the former view illustrates a board equipped with lens and prism and designed for photostatic work.

Fig. 2 is a vertical transverse section through the room, taken on the line 2—2, Fig. 1, and looking in the direction of the arrows.

Fig. 3 is a fragmentary sectional view taken on the line 3—3, Fig. 2, and looking in the direction of the arrows.

Fig. 4 is a fragmentary sectional view illustrating a modification.

Fig. 5 is a front elevation illustrating a novel form of copyholder board with portion of copy shown attached thereto.

Fig. 6 is a perspective view of a novel type of developing apparatus which may be employed in connection with the developing of the prints obtained from the copy photographed in the dark room shown in previous views.

Fig. 7 is a diagrammatic view illustrating the optical system employed.

Fig. 8 is a perspective view of a modification in the arrangement of photographic apparatus and dark room.

Referring to the drawings, more particularly Fig. 1 thereof, a fragmentary perspective of a room is indicated, the said room having the floor 10 and ceiling 11 with front wall 12 and side wall 13 thereof partly shown. This room is to be so constructed as to be light-proof; and in addition to the walls and floor and ceiling thereof, is provided with a transverse partition wall 14 which is displaced sufficiently from the front wall 12 to afford a corridor 15 of sufficient width to permit an operator to move freely therein. A door 16 is provided in the front wall 12 to afford entrance to the corridor 15 from the exterior of the room, while a door 17 in the partition wall 14 affords a means of entrance into the room proper. The said partition wall 14 extends from floor to ceiling, but is interrupted along its length as at 18; and in accordance with the invention, the interruption of this partition is so located that the partition wall 14 is wider at the door end than at the opposite end. In front of the interrupted portion 18 of said partition 14 is located a suitable copyholder 19 for receiving the copy to be photographed; and a suitable source of illumination 20 is designed in this particular instance to be reciprocated across the copyholder in order to suitably illuminate the copy during the photographing operation.

The latter operation is accomplished by a suitable photographic apparatus including a lens 21, Figs. 1A and 7, and a prism 21a by which the image is projected in a direction at right angles to the optical axis of said lens onto a suitable focusing frame 22.

This frame may be of special design in order better to accommodate the large sizes of prints obtained; and is more particularly shown in Fig. 5 of the drawings. As indicated, the novel focusing frame or ground glass member is composed of a plurality of ground glass squares 23 held or set in corresponding wooden frame pieces 24 and carry also central circular wooden blocks 25, all being flush with the surfaces of the various pieces 23 of ground glass. By this construction, it is possible to receive the image upon the ground glass of which a sufficient surface will be afforded to allow of sharp focusing; and at the same time, the sensitized material 26 may conveniently and securely be held to the focusing glass after the focusing operation, as by means of securing push pins 27 which may be forced through the sensitized paper material 26 into the wooden structural members. I do not, however, desire to restrict myself to the particular frame herein indicated, as any suitable focusing frame and adapted also to receive the sensitized material may be used for this purpose.

The entire photographic apparatus including the projecting portion and the focusing frame 22 is carried by a frame or platform 30 so that both may be moved as a unit, the frame to this end being mounted on pairs of wheels 31 supported thereby and designed to ride on tracks 32 which are disposed lengthwise of the room on the floor 10. The frame 30, furthermore, supports tracks 33 disposed transversely of the tracks 32 and upon which pairs of wheels 34 of the focusing frame 22 are designed to ride, whereby the latter may be caused to travel toward and away from the lens or projecting portion, being independently adjustable thereof through the intermediate open or free space. This independent movement of this focusing frame is arranged for photostatic reproduction to be in a direction at right angles to the reciprocatory movement of the lens-carrying or projecting portion of the apparatus; and the adjustment thereof may readily be effected by means of a hand wheel 35 of said frame. The image may thus be sharply defined thereby, being viewed on the ground glass portions 23 as reflected thereon by the prism 21a.

The adjustment of the platform or frame 30 itself is best accomplished by power as through an electric motor 36 carried by the said frame and to which motor electrical connection is made from a suitable source of power (not shown) through leads 37, one set of the wheels 31 being driven thereby in manner well understood. It will be appreciated, of course, that the focusing frame is also moved thereby in a direction perpendicular to the copyholder 19 as the frame 30 is adjusted toward and away from copy thereon in accordance with the size of the reproduction desired; and when the projecting portion is nearest the copy, the focusing frame will be at its greatest distance from the said projecting apparatus and vice versa. This makes it desirable, more particularly when working with smaller size copy, to shift the lens laterally as far as possible oppositely to the focusing frame while correspondingly moving the copy to the side. This enables full advantage to be taken of the restricted dimensions of the room, or in other words, the additional space thus gained can be utilized in the greater range of movement then possible in connection with the adjustment of the focusing frame. The partition 14 for this purpose is consequently made of less width at the side furthest removed from door 17 to accommodate the lateral shifting of the copy.

The lens-carrying portion in thus moving laterally toward the wall 13 must naturally maintain the light seal at the front of the camera; and to this end, is carried by a lens board 40 attached to lens carriage 40' which is laterally adjustable as a whole; and to the former is connected an apertured masking curtain 41 which is unrolled from and rolled up on corresponding spring rollers 42 to cover the opening produced by following the motion of the lens board, in manner well understood; and thus serves to maintain an effective seal against entrance of light at the front of the camera.

In order adequately to seal the projecting portion of the camera at the top, bottom and sides and at the same time permit the aforesaid necessary reciprocation, suitable provision is made along the sides as by attaching to the front of the camera structure extensible curtain members 45, the upper and lower edges of which ride freely in respective pairs of channels 46 and 47, the former being secured to the ceiling 11 while the latter is secured to the floor 10. In addition, there is secured along the bottom edge of the camera at the front thereof a flexible flap or scraper member 48 which wipes along the floor 10 as the camera is moved backwardly and forwardly; while the top edge of said camera is arranged to engage with a succession of transversely disposed depending flexible flaps 49 which are secured to the ceiling, or rather, a false ceiling 50 provided between the curtain members over this particular portion to better insure the seal. Should it be found that the curtains 45 are inadequate to effect the light seal, a further pair of curtains 51 may be provided adjacent and outside the former pair, as indicated more clearly in Fig. 4 of the drawings, it being understood that a similar pair of channels will be provided for the respective edges thereof.

If merely direct photographic work is contemplated, the rays of light from the copy may be continued straight through the reciprocable structure, the lens carriage 40' having the hinged back portion which is then dropped down to permit the rays to focus on a further focusing frame 52 which is movable toward and away from the said structure similarly to the frame 22. One of the tracks 32 may be utilized for this purpose together with an additional track 32'. Moreover, it will be necessary to substitute a different projecting member, merely a lens 53 being required and this is readily effected by making the lens board 40 removable and replacing the same by a similar board 54 provided with a suitable mounting 55 for the lens 53.

After the sensitized material has been exposed, it is of course necessary that the same be developed and fixed before it may again be exposed to light; and it is particularly desirable to conduct this operation within the dark room hereinbefore described, especially in view of the large sizes operated on and the difficulty in handling the same. It will be appreciated, however, that in view of the limited space available, the developing apparatus must be located so as not to interfere with the free movement of the projecting apparatus and focusing frame. To this end, a developing tank 60 of novel construction is arranged, for example, to be located in the corner of the room opposite the door 17 in the focusing frame side of the room and as close to the side and end walls of the room as possible. Furthermore, the tank, or rather superstructure 61 by which it is carried, is arranged to rest on the floor at the rear of the tank and to be suspended at its forward portion from the ceiling 11 as by suitable straps 62 and 62', so that said tank and associated apparatus will be raised sufficiently from the floor 10 to permit the frame 30 to move freely thereunder as the photographing apparatus is reciprocated on the tracks 32. By locating said tank as indicated as far as possible from the room portion adjacent door 17 and partition 14, it will be appreciated that the focusing frame 22 may be adjusted to the fullest extent along tracks 33 at the portion of the room nearest the copy board. As has been heretofore explained, it is also at this particular portion that the greatest movement of said frame 22 is necessary in preparing enlargements from copy of comparatively small size, the projecting portion of the photographic apparatus then being nearest the copyholder 19. As the size of the copy to be photographed increases, it becomes necessary to move the lens or projecting portion correspondingly away from the copyholder 19 and at the same time to bring the focusing frame 22 nearer the said lens portion and thus adapting itself nicely to the arrangement indicated.

The developing tank, shown more particularly in Fig. 6 of the drawings, is divided into three compartments, the first compartment 65 containing a rotatable roll 66 upon which the sensitized material after exposure is to be secured in any suitable manner, for example, by means of glass push pins or other suitable devices not attacked by the developing and fixing solutions, the roll 66 itself also being of suitable material as wood with paraffined surface. The next and adjacent compartment 67 is to contain water for washing off the developing solution from the print after having been developed out in the previous compartment, as by rotating the roller 66 by hand in the developing solution contained therein. The last compartment 68 is designed to contain the hypo or fixing solution for the print, after which the latter may without danger be exposed to light and be removed in any convenient manner from the dark room, or dried therein, if desired, before removal. In order conveniently to effect the transfer of the print from one compartment to the next, the roller 66 together with shaft 69 upon which it is rotatable and axially slidable is arranged to be bodily lifted out of one compartment, moved along the shaft 69 to a position over an adjacent or succeeding compartment and then lowered therein. This may be effected by attaching to the ends of the shaft 69 suitable cables 70 or other flexible means connecting said shaft ends with a reciprocating rod 71, said cables being brought over suitable pulleys 72. Rod 71 may be piston-reciprocated by compressed air or the like obtained from a motor-driven pump 73, as will be well understood. Thus, as the rod 71 is moved inwardly or outwardly, the roll 66 will be correspondingly raised and lowered from or into a corresponding compartment, thereby facilitating the handling of the somewhat heavy equipment required. It will be understood, of course, that the developing operations as well as the actual photographing operations are to be conducted under illumination of non-actinic character and which may be afforded in any convenient or well known manner through the provision, for example, of suitable lamps located within the room at convenient points but not herein shown.

As has been hereinbefore noted, the tank 60 and associated apparatus is raised from the floor and it is therefore desirable to provide a platform 75 in front of the same upon which an operator may walk to conduct the various developing, washing and fixing operations involved. Such platform, or at least a portion thereof, would interfere to some extent with the extreme movements of the focusing frame 22; and provision is therefore made to temporarily remove portions of the same so as to admit of the maximum adjustment of frame 22 under the fixed room dimensions. This may be accomplished by dividing a portion of the platform 75 nearest the door 17 end into a plurality of independently movable sections 76. These sections, as well as the remaining portion, are hingedly connected to the superstructure 61 and are to be attached by cables 77 or the like to the ceiling of the room and may be suitably counter-weighted so that they may be lifted out of the way by swinging upwardly to a substantially vertical position (several sections being indicated in this position by the dotted lines, Fig. 6 of the drawings). By this expedient, it will be apparent that the focusing frame 22 may be moved laterally practically to the front face of the superstructure 61 to obtain the maximum adjustment when enlarged.

Where space is not so important a consideration, it is possible to utilize the embodiment illustrated in Fig. 8 of the drawings and wherein a secondary room or closed compartment 80 is arranged to be moved as a whole within a room 81, having an entrance door 82 and front wall 83 upon which is to be mounted the copyholding board 84 suitably illuminated by a source of illumination 85. In order to provide for the reciprocation of compartment 80 toward and away from the copyholder 84, tracks 86 are provided on the floor 87 of said room 81 and upon which ride the wheels 88 of the said compartment 80, suitable motor apparatus (not shown) being employed for propelling the same, as is well understood. Access to the compartment 80 may be had through a door 90 in the rear wall 91 thereof; and in juxtaposition to the front wall 92 is placed the projecting portion 93 of the camera, which is laterally adjustable on tracks 94 as in the previous embodiment, while the focusing frame 95 is also laterally adjustable on the tracks 94 laid on the floor of said compartment. In this construction, the developing apparatus 97 may be located at the back of the room substantially against the wall 91 thereof so that the focusing frame 95 will have the maximum freedom of movement laterally, while the lens portion 93 will be capable of movement toward and away from the copyholder 84 to an extent depending upon the longitudinal dimensions of the room 81. It will be understood, of course, that the entire compartment 80 is to be sealed against the entrance of light and is to be provided with the usual non-actinic lighting arrangements (not shown) so that the various manipulations necessary may be properly performed.

I claim:

1. Combined camera apparatus and light-sealed dark room, comprising a transverse interrupted partition wall extending across the room at one end from floor to ceiling and affording a light corridor; a copyholder secured to the corridor end wall of the room opposite the interrupted portion of the said partition; a door in the corridor end wall, and a door in the partition member, said doors affording entrance to the corridor and from the latter into the dark room; means to illuminate the copyholder; a travelling structure with light-sealed top and front and reciprocable on the floor of the room toward and away from the copyholder; tracks upon which said structure is movable, and means to reciprocate said structure thereon; a lens supported by said reciprocable structure; extensible side walls secured to the respective partition members substantially at the interrupted portion and also to the front of said reciprocable structure to exclude light from the surrounding portion of the room; means to seal the upper and lower edges of said extensible walls and comprising channel members secured respectively to the floor and ceiling of said room and within which the respective upper and lower edges of said extensible side walls are designed to ride; a series of spaced depending and parallel flexible flaps transversely disposed over the ceiling for engagement with the top of the reciprocable structure; a flexible flap or scraper carried by the lower edge of the front of the reciprocable structure between said extensible walls to drag over the floor of the room and seal off light; and a focusing frame and holder for sensitized material associated with said reciprocable structure and separated therefrom by an intermediate open space.

2. Combined camera apparatus and light-sealed dark room, comprising a transverse interrupted partition wall extending across the room at one end from floor to ceiling, being of greater width at one side than at the other and affording a light corridor; a copyholder secured to the corridor end wall of the room opposite the interrupted portion of the said partition; a door in the corridor end wall, and a door in the wider portion of the partition member, said doors affording entrance to the corridor and from the latter into the dark room; means to illuminate the copyholder; a traveling structure with light-sealed top and front and reciprocable on the floor of the room toward and away from the copyholder; tracks upon which said structure is movable, and means to reciprocate said structure thereon; a lens carrier supported by said reciprocable structure and laterally movable independently thereof in a direction at right angles to the direction of reciprocation of said structure as a whole; a lens and lens board supported by the lens carrier of said reciprocable structure, and curtain members movable with said lens carrier over the said front of the structure to maintain the same closed off against entrance of light in all positions of the lens carrier; extensible side walls secured to the respective partition members substantially at the interrupted portion and also to the front of said reciprocable structure to exclude light from the surrounding portion of the room; means to seal the upper and lower edges of said extensible walls and comprising channel members secured respectively to the floor and ceiling of said room and within which the respective upper and lower edges of said extensible side walls are designed to ride; a false ceiling over the portion of the ceiling between said extensible walls, and a series of spaced depending and parallel flexible flaps transversely disposed over the false ceiling for engagement with the top of the reciprocable structure; a flexible flap or scraper carried by the lower edge of the front of the reciprocable structure between said extensible walls to drag over the floor of the room and seal off light; a prism carried by the lens board and cooperating with the said lens thereof for projecting an image at right angles to the optical axis of said lens; a laterally extending track carried by said reciprocable structure; an adjustable focusing frame and holder for sensitized material movably mounted on said lateral extension to receive an image reflected by the said prism; and means to move said focusing frame toward and away from said prism.

3. In a light-sealed room: the combination with a source of illumination, a copyholder, camera apparatus for photographing copy secured on said holder and embodying a laterally extending movable track, a lens support and a focussing element movable with said track toward and away from the copyholder and the focussing element being movable longitudinally of the track independently of the lens board; of a suspended developing apparatus located on the side of the said reciprocable structure at the far end of the darkened portion of the room and raised from the room floor to allow the said laterally extending track to move under and clear the same.

4. In a light-sealed room: the combination with a source of illumination, a copyholder, camera apparatus for photographing copy secured on said holder and embodying a laterally extending movable track, and a focusing element reciprocable thereon; of a suspended developing apparatus located on the side of the said reciprocable structure at the far end of the darkened portion of the room and raised from the room floor to allow the said laterally extending track to move under and clear the same; and a platform or runway associated with said developing apparatus at the front thereof, a portion of said platform being vertically foldable to permit the focusing element to be moved close to the developing apparatus and gain thereby additional focusing length.

5. Photographic copying apparatus, comprising a light-sealed room, a copyholder, means to illuminate copy held thereon, a camera embodying a combined movable lens support and light-sealing partition, light-excluding means movable with said partition to exclude light of the copy-illuminating means from a portion of the room and an independently adjustable focussing screen mounted in the darkened portion of the room, the said lens support and focussing screen being also movable as a whole relatively to the copyholder.

6. Photographic copying apparatus, comprisig a light-sealed room, a stationary copyholder, means to illuminate copy held thereon, a camera embodying a combined lens support and light-sealing partition, extensible curtain members between the copyholder and the said partition to exclude light of the copy-illuminating means from a portion of the room, and an independently adjustable focussing screen mounted in the darkened portion of the room, the said lens support and focussing screen being also movable as a whole relatively to the copyholder.

7. Photographic copying apparatus, comprising a light-sealed room, a partition dividing off one end of the room, the inner wall of same affording a stationary copyholder, means to illuminate copy held thereon, a camera embodying a combined lens support and light-sealing movable partition, movable light-excluding means included between said movable and stationary partitions to exclude light of the copy-illuminating means from the remainder of the darkened room portion, means to admit of access to the remainder and darkened portion of the room, and an independently adjustable focussing screen mounted in the darkened portion of the room, the said lens support and focussing screen being also movable as a whole relatively to the copyholder.

8. Photographic copying apparatus, comprising a light-sealed room, a partition dividing off one end of the room, the inner wall of same affording a stationary copyholder, means to illuminate copy held thereon, a camera embodying a combined lens support and light-sealing movable partition, movable light-excluding means included between said movable and stationary partitions to exclude light of the copy-illuminating means from the remainder of the darkened room portion, a door in the stationary partition outside of the light-excluding means, and an independently adjustable focussing screen mounted in the darkened portion of the room, the said lens support and focusing screen being also movable as a whole relatively to the copyholder.

9. Photographic copying apparatus, comprising a light-sealed room, a copyholder, means to illuminate copy held thereon, a camera embodying a lens support and a light-sealing partition with lens opening in advance of the lens support, both the support and partition being movable toward and away from the copyholder and the former movable independently of the latter, and an independent focussing screen disconnected from said sealing partition, adapted to cooperate with the lens thereof and movable in the sealed-off portion of the room relatively to said lens support.

10. Photographic copying apparatus, comprising a light-sealed room, a copyholder, means to illuminate copy held thereon, a camera embodying a lens support and a light-sealing partition with lens opening in advance of the lens support, both support and partition being movable toward and away from said copyholder and the support also in a direction parallel thereto.

11. Photographic copying apparatus, comprising a light-sealed room, a copyholder, means to illuminate copy held thereon, a camera embodying a lens support and a light-sealing partition with lens opening in advance of the lens support, both the support and partition being movable toward and away from the copyholder and the former movable independently of the latter, and an independent focusing screen disconnected from said sealing partition, adapted to cooperate with the lens thereof and movable in the sealed-off portion of the room relatively to and with said lens support.

12. Photographic copying apparatus, comprising a light-sealed room, a copyholder, means to illuminate copy held thereon, a camera embodying a lens support and a light-sealing partition with lens opening in advance of the lens support, both the support and partition being movable toward and away from the copyholder and the former movable independently of the latter, an independent focusing screen disconnected from said sealing partition, adapted to cooperate with the lens thereof and movable in the sealed-off portion of the room relatively to and with said lens support, and an additional independent focusing screen disconnected from said sealing partition, adapted to cooperate with the lens thereof, and movable with said partition in the sealed-off portion of the room and relatively to said lens support.

13. Photographic copying apparatus, comprising a light-sealed room, a copyholder, means to illuminate copy held thereon, a camera embodying a lens support, and a light-sealing partition with lens opening in advance of the lens support and unattached at the bottom, flexible walls attached to the sides of the partition and adapted to seal off with said partition the copyholder portion of the room from the remainder and both said partition and lens support being movable toward and away from said copyholder.

14. Photographic copying apparatus, comprising a light-sealed room, a copyholder, means to illuminate copy held thereon, a camera embodying a lens support, a light-sealing partition with lens opening in advance of the lens support and unattached at the bottom and top, flexible walls attached to the sides of the partition, and means associated with the top and bottom edges of the partition adapted to seal off with said partition the copyholder portion of the room from the remainder and both said partition and lens support being movable toward and away from said copyholder.

15. In photographic copying apparatus, comprising a light-sealed room, a copyholder, means to illuminate copy held thereon, and a camera movable therein: a light-excluding partition member of said camera movable longitudinally of the room toward and away from said copyholder, and unattached along its bottom edge, and extensible side walls secured to the partition member adapted to seal off with said partition member the copyholder portion of the room from the remainder.

16. In photographic copying apparatus, comprising a light-sealed room, a copyholder, means to illuminate copy held thereon, and a camera movable therein: a light-excluding partition member of said camera movable longitudinally of the room toward and away from said copyholder and unsecured along the top and bottom edges, extensible side walls secured to the partition member and flexible means associated with the upper and lower edges thereof to seal off with said partition member the copyholder portion of the room from the remainder.

17. In photographic copying apparatus, comprising a light-sealed room, a copyholder, means to illuminate copy held thereon, and a camera movable therein: a light-excluding partition member of said camera movable longitudinally of the room toward and away from said copyholder and unsecured along the top and bottom edges, extensible side walls secured to the partition member, channels secured to the ceiling of the room to receive the upper edges of the extensible side walls, and flexible means associated with the upper and lower edges of the partition to seal off with said partition member the copyholder portion of the room from the remainder.

18. In photographic copying apparatus, comprising a light-sealed room, a copyholder, means to illuminate copy held thereon, and a camera movable therein: a light-excluding partition member of said camera movable longitudinally of the room toward and away from said copyholder and unsecured along the top and bottom edges, extensible side walls secured to the partition member, channels secured to the ceiling of the room to receive the upper edges of the extensible side walls, a series of spaced depending and parallel flexible flaps transversely disposed between the extensible walls over the ceiling of the room for engagement with the upper edge of the partition member, and a flexible flap or scraper carried by the lower edge of said partition member between the extensible walls to drag over the floor.

19. Photographic copying apparatus embodying, in combination, a light-sealed room, a copyholder mounted in said room, means to illuminate copy on said copyholder, a camera embodying a lens, a lens-support and a movable light-sealing partition partially dividing said room into illuminated and dark sections, and light-sealing means movable with said partition for varying the length of the said illuminated and dark sections comprising parts having movement relatively to each other, one of said parts comprising a wall of said room.

20. Photographic copying apparatus embodying, in combination, a light-sealed room, a copyholder mounted in said room, means to illuminate copy on said copyholder, a camera embodying a lens, a lens-support and a movable light-sealing partition partially dividing said room into illuminated and dark sections, and light-sealing means movable with said partition for varying the length of the said illuminated and dark sections comprising a plurality of parts, one of said parts being rigid and relatively stationary in relation to the other.

21. Photographic copying apparatus embodying, in combination, a light-sealed room, a copyholder mounted in said room, means to illuminate copy on said copyholder, a camera embodying a lens, a lens-support and a movable light-sealing partition partially dividing said room into illuminated and dark sections, light-sealing means movable with said partition for varying the length of the said illuminated and dark sections composed of a plurality of parts, one of said parts being rigid and relatively stationary in relation to the others and comprising one of the walls of the room in which the apparatus is mounted.

22. Photographic copying apparatus embodying, in combination, a light-sealed room, a copyholder mounted in said room, means to illuminate copy on said copyholder, a camera embodying a lens, a lens-support and a movable light-sealing partition partially dividing said room into illuminated and dark sections, light-sealing means movable with said partition for varying the length of the said illuminated and dark sections composed of a plurality of parts and comprising two extensible side walls cooperating with the floor and ceiling of the room in which the apparatus is mounted.

23. Photographic copying apparatus, comprising a copyholder, means to illuminate the same, a movable partition and lens support, and extensible side walls associated with the partition between same and the copyholder with the lower edge of the former extending substantially to the floor and constituting a light-sealed operating space permitting bodily maneuvering therein.

24. Photographic copying apparatus, comprising a copyholder, means to illuminate the same, a movable partition and lens support, and extensible side walls associated with the partition between same and the copyholder, the former having associated with its lower edge means for sealing the same, at the floor of the room but unattached to said floor, against the passage of light, said partition, the lower edge sealing means and the extensible side walls constituting a light-sealed operating space permitting bodily maneuvering therein.

25. Photographic copying apparatus comprising a light-sealed room, a copyholder mounted in said room, means to illuminate copy on said copyholder, a camera embodying a lens, a lens-support and a movable light-sealing partition, a prism also carried by said light-sealing partition and cooperating with said camera lens for projecting an image from the copyboard at right angles to the optical axis of said lens, and a focusing frame and holder for sensitized material mounted in said dark room section to move longitudinally parallel to the optical axis of the said lens and also at right angles thereto.

26. In photographic apparatus, a lens-support and lens with prism attached thereto, a copyholder, means for increasing the focusing limits comprising a light-sealing partition member with an elongated lateral opening, means for moving said lens-support laterally behind the partition in a plane parallel to the copyholder with the optical axis of lens passing through said elongated opening, an apertured masking means movable over said opening with the lens-support to seal the remainder of said opening against passage of light, and a focusing frame and holder for sensitized material mounted in said dark room section to move longitudinally parallel to the optical axis of the said lens and also at right angles thereto.

In testimony whereof I affix my signature.

ELLIS WEISKER.